Oct. 21, 1924.
L. S. HACKNEY
1,512,595
CONTROL EXTENSION FOR TRACTORS
Filed Nov. 5, 1920
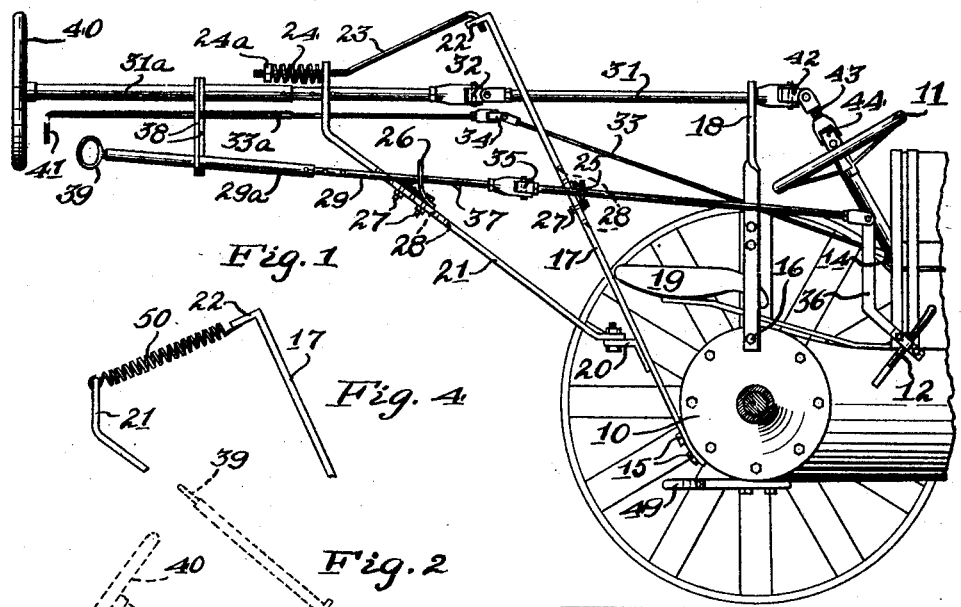
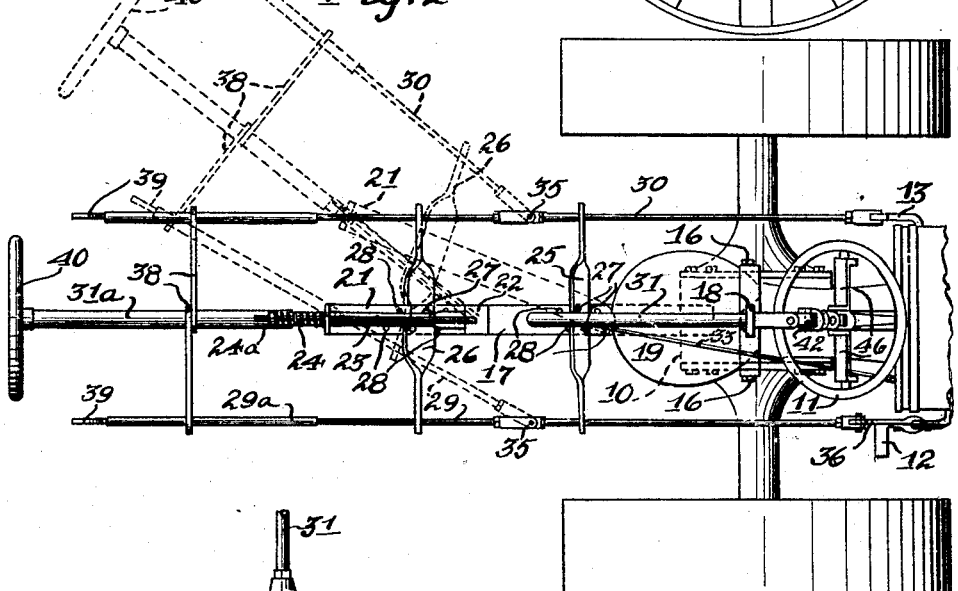
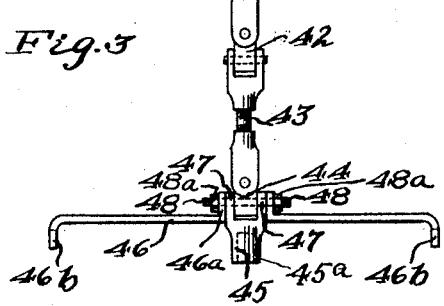
Inventor:
Leslie S. Hackney,
by: John E. Stryker.
Attorney.

Patented Oct. 21, 1924.

1,512,595

UNITED STATES PATENT OFFICE.

LESLIE S. HACKNEY, OF ST. PAUL, MINNESOTA.

CONTROL EXTENSION FOR TRACTORS.

Application filed November 5, 1920. Serial No. 421,938.

*To all whom it may concern:*

Be it known that I, LESLIE S. HACKNEY, a citizen of the United States, residing at St. Paul, in the county of Ramsey and State of Minnesota, have invented new and useful Improvements in Control Extensions for Tractors, of which the following is a specification.

My invention relates to improvements in control extensions for tractors. As is well known much of the work done by tractor drawn machinery requires the presence of an operator on the drawn vehicle. This necessitates, with many tractors in use, the employment of two operators, one on the tractor and one on the vehicle and where control extensions are furnished one of the supports for the control mechanism is mounted on the drawn vehicle. Further, it is difficult and sometimes impossible to find a suitable location for the vehicle support.

The object of my invention is to facilitate and cheapen the operation of a tractor by making it possible for a single operator to control both the tractor and drawn vehicle.

More specifically, it is my object to provide an attachment for the steering wheel and control levers of a tractor for efficiently regulating its operation from a position on a trailer or drawn machine.

A further object of my invention is to provide mechanism of this kind which can be quickly and easily attached to a tractor.

In the drawings Figure 1 is an elevation showing my device attached to a standard type of tractor, one wheel of the latter being removed for clearness; Fig. 2 is a plan view of the same; Fig. 3 is a detail elevation of the steering wheel yoke and universal joints and Fig. 4 shows an alternate form of stay for the rod support.

Referring to the accompanying drawings, I have used the reference numeral 10 to indicate the differential housing of a traction vehicle of common type; 11 is the vehicle steering wheel; 12 the clutch lever; 13 the gear shift lever and 14 the throttle.

My device is adapted to be attached to the differential housing 10 by means of bolts 15 and 16 which pass through perforations in the main supports 17 and 18, respectively, of my device and are secured in suitable tapped holes in said housing. The support 18 is perforated near its upper end to furnish a bearing for the forward end of the steering extension rod and is formed with two legs which straddle the seat 19 on the tractor and are secured to opposite sides of the housing 10 by the bolts 16. Pivotally attached to an ear 20, formed on the support 17, is a third supporting member 21 and the upper end of the support 17, is bent at substantially a right angle to form an ear 22 through which the upper end of a stay rod 23 passes. The opposite end of the rod 23 is adjustably fastened to the upper end of the member 21 by means of a nut 24$^a$. A spring 24 interposed between the nut 24$^a$ and the end of the support 21 makes this connection resilient as well as adjustable. Rigidly and severally secured to the supports 17 and 21 are two cross bars 25 and 26. These bars are adjustable longitudinally with respect to the supports by means of bolts 27 which may be placed in suitable pairs of perforations 28 in said supports. The ends of the bars 25 and 26 are twisted and perforated to form supporting bearings for the lever extension rods 29 and 30.

The steering extension rod 31 has an intermediate bearing in the support 17 and a rear bearing in the support 21. Between these bearings is a universal joint 32 which allows the rod 31 to be rotated for steering the tractor while the drawn vehicle is at an angle therewith when changing direction. A rod 33 for controlling the position of the throttle lever 14 from a position on the drawn vehicle, is also journalled in the supports 17 and 21 and provided with a universal joint 34 similar to the joint 32.

While the principle motion of the rods 29 and 30 in controlling the clutch and gear shift levers, respectively, is longitudinal, joints 35, which permit bending said rods in a horizontal plane, are provided. A suitable link 36 is pivotally connected to the forward end of the rod 29 and rigidly fastened to the clutch lever 12, said link being formed so that rearward movement of the rod 29 will disengage the clutch. The perforation in the end of the bar 26 for supporting the rod 29 is elongated vertically to permit the passage of a lug 37 when the rod 29 is drawn rearward. Thus, when the latter rod has been drawn rearward the lug 37 may be caused to engage the bottom of the perforation in the bar 26 to hold the clutch out of engagement.

The rod 30 is pivotally connected at its forward end to the upper end of the gear shift lever 13. A pair of straps 38, loosely mounted on the steering rod 31 at their upper ends, are perforated to receive the rods 29 and 30 at their lower ends to form additional supports for the rear portions of the latter rods. These rods and the rods 31 and 33 are made extensible being severally provided with the sleeves 29ª, 30ª, 31ª and 33ª into which the rearward ends of said rods pass and are adjustably secured. Rigidly mounted in the ends of the sleeves 29ª and 30ª are the grips 39 for manipulating the rods 29 and 30. An extension steering wheel 40 is fast on the end of the sleeve 31ª and the rod 31 is formed with a downward bent end 41 for turning the rod 33.

Connecting the forward end of the rod 31 with the tractor steering wheel 11 is linkage (shown in detail in Fig. 3) which is adapted to efficiently transmit rotation of the rod 31 to the steering wheel 11 for all positions of said rod. This linkage consists of a universal joint 42, a link rod 43, another universal joint 44, a nut 45 and a pair of arms 46. The universal joints 42 and 44 are of common type and are provided to join the ends of the link rod 43 with the rod 31 at one end and with a nut 45 and arms 46 at the other end. The nut 45 is adapted to replace the usual nut on the threaded upper end of the steering post, being formed with a tapped hole 45ª in its center, and a pair of ears 47, on the upper end of said nut, are pierced by a bolt 48 which also passes through the upwardly projecting ends 46ª of the arms 46 and the lower block or link of the universal joint 44. The ends of the bolt 48 are threaded to receive suitable nuts 48ª to rigidly fasten the arms 46 to the nut 45. This bolt also forms one of the pivot pins of the universal joint 44. The outward ends 46ᵇ of the arms 46 are bent downward and forked to straddle and engage opposite spokes in the steering wheel 11.

An alternate form of connection between the upper ends of the supports 17 and 21 is shown in Fig. 4. In this construction a coiled spring 50 replaces the rod 23, spring 24 and nut 24ª to form a resilient stay for the upper end of the hinged support 21.

In operation my control extension being bolted to the tractor as shown and the vehicle to be drawn being connected to a suitable lunette 49 bolted to the underside of the frame of the tractor (Figure 1) the length of the rods 29, 30, 31 and 33 can be adjusted by means of the telescopic sleeves 29ª, 30ª, 31ª and 33ª, respectively and the height of said control rods may be adjusted by moving the cross bars 25 and 26 up or down on the supports 17 and 21 and by changing the position of the nut 24ª on the rod 23. In turning the tractor and vehicle the support 21 pivots on the ear 20 at its lower end and the rod 23 pivots in the ear 22, on the upper end of the support 17, thus, permitting the upper end of the support 21 to turn and carry the several control rods to a position such as is shown in dotted lines in Fig. 2.

The tractor can, therefore, be steered and otherwise controlled by an operator located on a drawn vehicle through flexible mechanism which is wholly mounted on the tractor.

Having described my invention what I claim as new and desire to protect by Letters Patent is:

1. In a device of the class described an extension steering wheel, a steering rod connecting said extension wheel with the steering wheel of a tractor, a rigid, rearwardly inclined support for said rod mounted on the tractor, a second rearwardly inclined support pivotally joined to said first mentioned support, actuating rods carried by said supports and joined to the control levers of a tractor and joints positioned in said steering and actuating rods between said rigid and pivoted supports.

2. In a device of the class described an extension steering wheel, a steering rod connecting said wheel with the steering wheel of a tractor, a rigid support for said rod mounted on the tractor, a rearwardly inclined support pivotally joined to said first mentioned support, gear shifting and clutch control rods joined to the control levers of a tractor and carried by said supports and joints positioned in said steering and actuating rods between said rigid and pivoted supports.

3. In a device of the class described an extension steering wheel, a rod connecting said wheel with the steering wheel of a tractor, a rigid support for said rod mounted on the tractor, a rearwardly inclined support pivotally joined at one end to said first mentioned support and resiliently connected thereto at its other end and a joint in said rod between said rigid and pivoted supports.

4. In a control extension a plurality of jointed rods adapted to be connected to the controlling mechanism of a tractor, a rigid support for the forward portion of said rods mounted on said tractor, a second support for the rearward portion of said rods pivotally joined to said first mentioned support, a cross bar on each of said supports carrying a pair of actuating rods and means for raising and lowering said cross bars on said supports.

5. In a control extension a plurality of jointed rods adapted to be connected to the controlling mechanism of a tractor, a rigid support for the forward portion of said rods mounted on said tractor, a second support for the rearward portion of said rods and means connecting said second support with said rigid support comprising a flexible joint at the lower end of said second support and resilient means connecting the upper ends of said supports.

6. In a control extension a plurality of jointed rods adapted to be connected to the controlling mechanism of a tractor, a rigid support for the forward portion of said rods mounted on said tractor, a second support for the rearward portion of said rods, and articulated and resilient means connecting said second support with said rigid support.

Whereof, I have hereunto subscribed my name to this specification.

LESLIE S. HACKNEY.